United States Patent [19]

Bekhaled

[11] Patent Number: 4,700,257
[45] Date of Patent: Oct. 13, 1987

[54] SUPERCONDUCTIVE AC CURRENT LIMITER

[75] Inventor: Mohammed Bekhaled, Belfort, France

[73] Assignee: Alsthom, Paris, France

[21] Appl. No.: 938,194

[22] Filed: Dec. 5, 1986

[30] Foreign Application Priority Data

Dec. 5, 1985 [FR] France .................................. 85 18026

[51] Int. Cl.$^4$ .............................................. H02H 3/08
[52] U.S. Cl. ...................................... 361/19; 323/355; 336/DIG. 1; 361/58
[58] Field of Search ............. 361/19, 58; 336/DIG. 1; 335/216; 323/355

[56] References Cited

U.S. PATENT DOCUMENTS

| 3,703,664 | 11/1972 | Cronin ................................... 361/58 |
| 4,045,823 | 8/1977 | Parton ................................... 361/58 |
| 4,117,524 | 9/1978 | Parton et al. ......................... 361/58 |

FOREIGN PATENT DOCUMENTS

| 1163027 | 9/1969 | United Kingdom . |
| 608205 | 5/1978 | U.S.S.R. ....................... 336/DIG. 1 |
| 936203 | 6/1982 | U.S.S.R. ............................... 361/19 |

OTHER PUBLICATIONS

Gerlach and Muller, Elektrie (1977), vol. 31, No. 11, Nov. 1977, pp. 606-610.

Harrowell, J., Phys. D., Applied Phys., vol. 7, 1974, pp. 491-499.

Primary Examiner—William H. Beha, Jr.
Attorney, Agent, or Firm—Sughrue, Mion, Zinn, Macpeak & Seas

[57] ABSTRACT

An AC current limiter for a power transport line including an overload circuit-breaker member (6), the limiter comprising a transformer having a primary winding (6A) connected in series between the power supply circuit (R) and the load circuit (U) and one or more secondary windings (9) of superconductor material contained in a cryogenic enclosure (11) and short-circuited on themselves, the leakage reactance of the transformer as seen from the primary winding being low, and the resistance of the, or each, secondary winding when in the non-superconducting state and as seen from the primary being much greater than the nominal impedance of the transformer. The current limiter includes the improvement whereby the, or each, secondary winding of the transformer comprises an active winding (12) in association with a set of auxiliary windings (13, 14, 15, 16), said set of auxiliary windings being constituted by an even number of series-connected auxiliary windings wound in opposite directions, with the total number of turns in one direction being equal to the total number of turns in the opposite direction, and with the thermal capacity of the secondary winding as a whole being sufficiently high to limit the expansion thereof to a value which remains small during the time it takes said circuit-breaking member to operate.

1 Claim, 2 Drawing Figures

SUPERCONDUCTIVE AC CURRENT LIMITER

The present invention relates to an alternating current limiter for a power transport line which also includes a circuit-breaker member for interrupting the line in the event of an overload current. The limiter comprises a transformer with a primary winding connected in series between a power supply circuit and a load circuit and with one or more secondary windings of superconductive material contained in a cryogenic enclosure and connected in a short-circuit loop. The leakage reactance of the transformer as seen from the primary winding is low, and the non-superconducting resistance of the, or each, secondary winding as seen from the primary winding is very much greater than the nominal impedance of the transformer.

BACKGROUND OF THE INVENTION

Alsthom's published French patent application No. 2573938 describes a limiting filter of this type. However, when using such current limiters on lines transporting high powers, it is very difficult to simultaneously satisfy requirements relating to resistance in the normal (i.e. the non-superconducting) state and requirements relating to the thermal capacity (or heat content) of the secondary winding(s). In order to keep expansion of the superconductor material and of the matrix of normal conductor metal in which it is embedded to very low values, it is the practice to ensure that the temperature of the secondary winding(s) does not rise to more than 100°K in the time it takes for the circuit-breaker member to interrupt a fault current, which usually takes three or four mains cycles.

Preferred implementations of the present invention provide AC current limiters for high power transport lines in which the non-superconducting resistance of the secondary windings as seen from the primary winding is very much greater than the nominal impedance of the transformer, and in which the thermal capacity of said secondary windings is sufficiently high for their expansion to be limited to tolerable values in the event of their being heated by a short circuit current for the time it takes the circuit breaker to interrupt that current.

SUMMARY OF THE INVENTION

The present invention provides an AC current limiter for a power transport line including an overload circuit-breaker member, the limiter comprising a transformer having a primary winding connected in series between the power supply circuit and the load circuit and one or more secondary windings of superconductor material contained in a cryogenic enclosure and short-circuited on themselves, the leakage reactance of the transformer as seen from the primary winding being low, and the resistance of the, or each, secondary winding when in the non-superconducting state and as seen from the primary being much greater than the nominal impedance of the transformer, the current limiter including the improvement whereby the, or each, secondary winding of the transformer comprises an active winding in association with a set of auxiliary windings, said set of auxiliary windings being constituted by an even number of series-connected auxiliary windings wound in opposite directions, with the total number of turns in one direction being equal to the total number of turns in the opposite direction, and with the thermal capacity of the secondary winding as a whole being sufficiently high to limit the expansion thereof to a value which remains small during the time it takes said circuit-breaking member to operate.

BRIEF DESCRIPTION OF THE DRAWING

An embodiment of the invention is described below by way of example with reference to the accompanying drawing, in which.

MORE DETAILED DESCRIPTION

Figure 1:
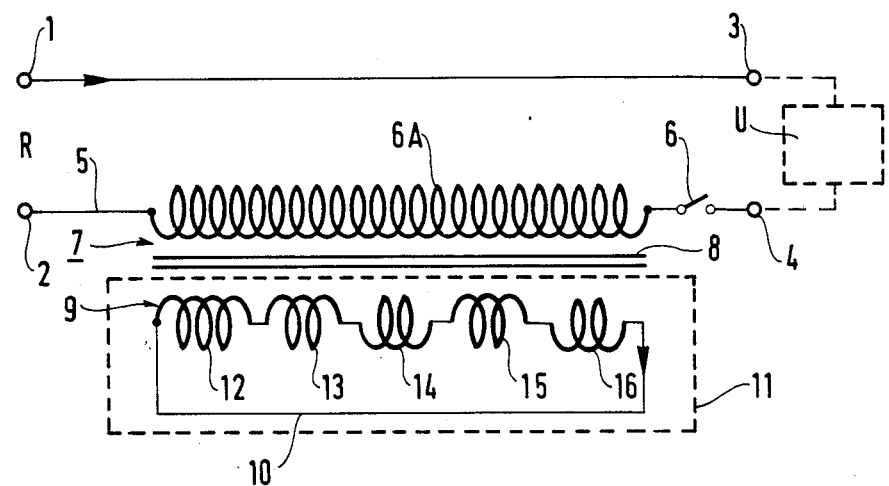
FIG. 1 is a diagram of a single phase AC current limiter.

In FIG. 1, references 1 and 2 designate terminals of a power supply network R or of an alternator, and references 3 and 4 designate the terminals of a load network U. A conductor 5 constituted by copper at ordinary temperature or at a superconducting temperature connects the terminal 2 to the terminal 4, and the primary winding 6A of a transformer 7 having a magnetic circuit 8 and a secondary winding 9 is inserted in series with the conductor 5 upstream from a circuit breaker 6. The secondary winding is short-circuited on itself (by conductor 10) in a cryogenic enclosure 11 maintained at a temperature of 4°K., for example by means of a bath of liquid helium.

The secondary winding of the transformer comprises a first or "active" winding 9 for compensating the ampere-turns of the primary winding, and a set of auxiliary windings constituted by an even number of identical auxiliary windings connected in series with one another and with the active winding, said auxiliary windings being wound alternately in opposite directions. In this case there are four such auxiliary windings 13, 14, 15, and 16. The function of the set of auxiliary windings is to increase both the resistance and the thermal capacity of the overall secondary winding at the moment of transition from the superconducting state to the non-superconducting state, while avoiding any active function relative to the primary winding.

In the event of a short-circuit or some other fault on the line including the conductor 5 and leading to an overload current, the line current exceeds a predetermined threshold current $I_{max}$, thereby causing the superconducting secondary winding to return to the non-superconducting state and thus causing the impedance of the transformer, as seen from the primary winding, to become close to its open circuit impedance, i.e. to become very large relative to its nominal impedance. After a transient period of varying duration, the line current tends towards the the transformer's open circuit current.

The magnetic circuit must be designed so that the magnetizing current drawn when the secondary winding goes open circuit is less than the maximum value of current for the line. The leakage reactance should be as low as possible.

Figure 2:
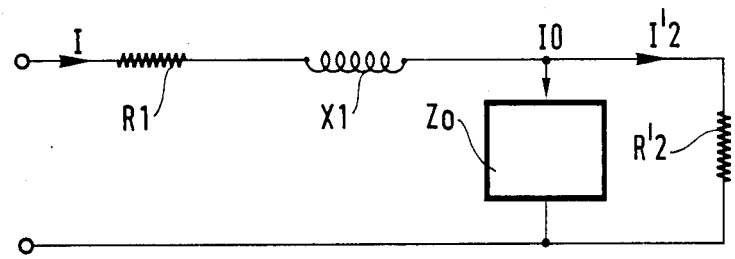
FIG. 2 is an equivalent circuit diagram of the current limiter after its secondary circuit has changed over to the non-superconducting state due to a short circuit downstream from the limiter.

The equivalent circuit of FIG. 2 corresponds to a secondary winding which has switched over to the non-superconducting state after a short circuit in the line downstream from the transformer primary winding, and I designates the current in the primary winding, $R_1$ designates its resistance (negligible), $X_1$ designates the total leakage reactance as seen by the primary (negligible), $Z_0$ designates the open circuit impedance of the transformer, $I_0$ designates the corresponding open circuit current, $R'_2$ designates the resistance of the secondary winding as seen from the primary winding (after the transition to the non-superconducting state), and $I'_2$ designates the corresponding current.

The current limiter must satisfy two important conditions.

Firstly, the current I flowing through the primary winding must not exceed the fixed maximum current $I_{max}$. This condition means that the resistance of the secondary winding $R'_2$, as seen from the primary winding, is high. $R'_2$ must be very much greater than the nominal impedance $Z_n$ of the transformer.

Further, the secondary winding must continue to perform well while being heated for a period of time $\Delta t_1$ which elapses before the circuit-breaker device 6 can interrupt the current. This implies that the superconductor winding must have sufficient thermal capacity to ensure that expansion remains limited during said period $\Delta t_1$. It is common practice to ensure that the winding temperature is still below 100°K. when the circuit-breaker member operates (where $\Delta t_1$ corresponds to three or four mains periods), since the various expansion coefficients of superconductor material and of the non-superconductor material used to provide a matrix in which the superconductor material is embedded generally differ by very little up to a temperature of about 100°K.

If the secondary winding comprises a single layer of coils and serves solely to cancel the ampere turns of the primary winding, then the resistance in the superconducting state $R'_2$ is zero and the leakage reactance at $X_1$ as seen from the primary is very low. After changing to the non-superconducting state, its resistance becomes $R'_2 = R'_{21}$ and its thermal capacity is $H_1$. As a result it is heated by $\Delta T_1$ during the period $\Delta t_1$ before the circuit-breaking member comes into operation.

For a secondary winding as described with reference to FIG. 1 and including an even number of auxiliary layers wound in opposite directions and connected in series, i.e. 2n auxiliary layers, the resistance $R'_2$ in the superconducting state is still zero, and the leakage reactance X as seen from the primary winding is slightly greater than that presented by a single layer secondary winding but is still very small. After the transition to the non-superconducting state, and assuming that the auxiliary windings 13, 14, 15, 16, have the same number of turns as the active winding 12, then the resistance becomes $R'_2 = (2n+1)R'_{21}$ and the thermal capacity becomes $(2n+1)H_1$.

As a result the temperature rise has the value:

$$\Delta T_2 = \Delta T_1/(2n+1)^2.$$

This is much less than for the single winding case. The secondary winding therefore heats up much less and is not subjected to major expansion before the circuit-breaker members come into operation.

I claim:

1. In an AC current limiter for a power transport line including a power supply circuit, feeding a load circuit via an overload circuit-breaker member, said limiter comprising a transformer having a primary winding connected in series between the power supply circuit and the load circuit and at least one secondary winding of superconductor material contained in a cryogenic enclosure and short-circuited on itself, the leakage reactance of the transformer as seen from the primary winding being low, and the resistance of the at least one secondary winding when in the non-superconducting state and as seen from the primary being much greater than the nominal impedance of the transformer, the improvement whereby said at least one secondary winding of the transformer comprises an active winding in association with a set of auxiliary windings, said set of auxiliary windings being constituted by an even number of series-connected auxiliary windings wound in opposite directions, with the total number of turns in one direction being equal to the total number of turns in the opposite direction, and with the thermal capacity of the secondary winding as a whole being sufficiently high to limit the expansion thereof to a value which remains small during the time it takes said circuit-breaking member to operate.

* * * * *